United States Patent
Choi

(10) Patent No.: US 7,508,784 B2
(45) Date of Patent: Mar. 24, 2009

(54) METHOD FOR CANCELING NOISE IN A MOBILE TERMINAL

(75) Inventor: Woong-Gil Choi, Daegu (KR)

(73) Assignee: LG. Electronics Inc., Seoul (KR)

( * ) Notice: Subject to any disclaimer, the term of this patent is extended or adjusted under 35 U.S.C. 154(b) by 669 days.

(21) Appl. No.: 10/882,352

(22) Filed: Jul. 2, 2004

(65) Prior Publication Data

US 2005/0025088 A1     Feb. 3, 2005

(30) Foreign Application Priority Data

Jul. 3, 2003     (KR) ........... 10-2003-0045021

(51) Int. Cl.
*H04B 7/212* (2006.01)
(52) U.S. Cl. .......... 370/321; 455/63.1; 455/296
(58) Field of Classification Search ........... 370/321; 455/63.1, 296
See application file for complete search history.

(56) References Cited

U.S. PATENT DOCUMENTS

| | | | |
|---|---|---|---|
| 5,208,494 A * | 5/1993 | Ikonen et al. ........ | 327/384 |
| 5,304,947 A * | 4/1994 | Carlsson ........... | 330/279 |
| 6,049,724 A * | 4/2000 | Rozenblit et al. .... | 455/572 |
| 6,756,773 B2 * | 6/2004 | Koretsky et al. ..... | 323/234 |
| 2004/0229580 A1 * | 11/2004 | Chen ............... | 455/130 |

FOREIGN PATENT DOCUMENTS

| EP | 0387108 | 9/1990 |
|---|---|---|
| JP | 09-261108 | 10/1997 |
| JP | 2002-050973 | 2/2002 |

OTHER PUBLICATIONS

European Search Report Dated Feb. 4, 2005.
Japanese Office Action dated Aug. 8, 2006.

* cited by examiner

*Primary Examiner*—Barry W Taylor
(74) *Attorney, Agent, or Firm*—Ked & Associates LLP

(57) ABSTRACT

A system and method improves performance of a GSM TDMA-based terminal by canceling TDMA noise. When a time burst is generated on a battery power line, a check is performed to determine whether a current time slot is an idle slot, and if the current time slot is an idle slot a noise level is applied to generate an offset voltage. An overall battery voltage drop is reduced based on the applied noise level. Supply noise to the idle slot may be performed by applying an arbitrary channel when an idle slot corresponds to a baseband frequency. Alternatively, a transceiver may generate thermal noise in an idle slot state and a corresponding noise level may then be supplied to the power amplifier.

34 Claims, 4 Drawing Sheets

METHOD FOR CANCELING NOISE IN A MOBILE TERMINAL

BACKGROUND OF THE INVENTION

1. Field of the Invention

The present invention generally relates to mobile communication systems, and more particularly to a system and method for canceling noise in a mobile terminal.

2. Background of the Related Art

Generally speaking, there are two types of wireless systems: Code Division Multiple Access (CDMA)-based synchronous systems and Time Division Multiple Access (TDMA)-based asynchronous systems. The TDMA-based asynchronous system most widely used in Europe is the Global System for Mobile communications (GSM) system. GSM combines TDMA with a Frequency Division Multiple Access (FDMA) scheme. In a GSM mobile terminal, noise is generated from an audio output terminal due to a time burst ripple on a battery power line. This form of noise is called TDMA noise.

FIG. 1 shows a power unit of a mobile terminal. This unit is designed so that its audio power terminal is separately formed and one or more audio-exclusive Low Drop Output regulators (LDOs) are used to minimize influence of noise within an audio frequency range caused by ripple in a power terminal of an audio amplifier.

When operated in accordance with a related-art method, the FIG. 1 power unit merely focuses on minimizing TDMA noise after it has been created. This method does not prevent the generation of TDMA noise at its source. Also, because additional circuits such as the audio power terminal and audio-purpose power regulator are used, the related-art method does not promote miniaturization, which is the recent trend in mobile terminal design.

SUMMARY OF THE INVENTION

An object of the invention is to solve at least the above problems and/or disadvantages and to provide at least the advantages described hereinafter.

Another object of the present invention is to provide a system and method for more effectively canceling TDMA noise in a mobile terminal used in a communication system, including but not limited to a GSM system.

To achieve at least the foregoing objects and advantages in whole or part, the present invention provides a system and method for canceling noise in a mobile terminal including: a step in which when a time burst is generated on a battery power line, it is checked whether a current time slot is an idle slot; a step in which if the current time slot is the idle slot, a noise level is applied to generate an offset voltage; and a step in which an overall battery voltage drop is reduced. Preferably, the noise level can be supplied by applying an arbitrary channel when the current time slot is the idle slot in a baseband, or can be suitably supplied as a transceiver generates a thermal noise in the idle slot state.

DETAILED DESCRIPTION OF PREFERRED EMBODIMENTS

The present invention is a system and method for canceling noise which is preferably applied to a mobile terminal of a mobile communication system, which includes but is not limited to a GSM system. If desired, the method may also be used for terminals that conform to other communication standards and/or protocols. When applied in this manner, the present invention advantageously reduces audio frequency noise of a power terminal, which, in turn, suppresses or cancels TDMA noise generated at the mobile terminal.

Figure 2:
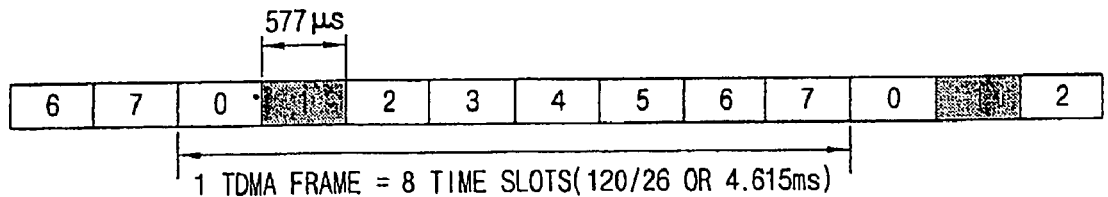
FIG. 2 is a diagram showing a TDMA time frame.
Figure 3:
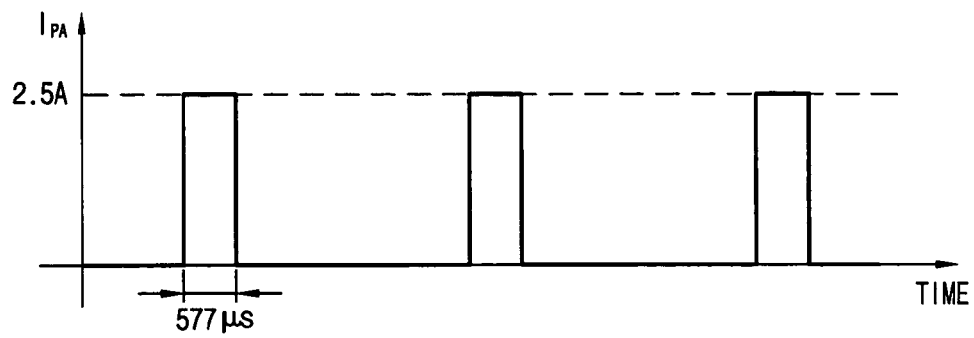
FIG. 3 is a graph showing a relationship between current amplified by a time burst and a voltage drop in accordance with the related art.
Figure 3:
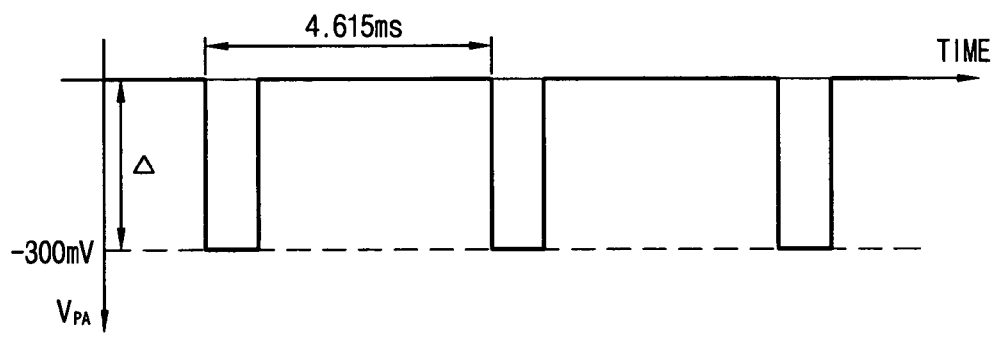

FIG. 2 shows a structure of a TDMA time frame, and FIG. 3 is a graph showing a relationship between current amplified by a time burst and a voltage drop in accordance with a related-art terminal. Also, in FIGS. 2 and 3, a basic TDMA unit is referred to as a time slot (or burst period), which has a predetermined duration of, for example, 15/26 ms (that is, about 577 μs) for some applications.

One TDMA frame typically includes 8 time slots (#0-#7). With this format, eight calls can be simultaneously maintained per channel. Also, one TDMA frame has a length of 577 μs*8; that is, about 4.615 ms. In a GSM system, data is transmitted in only one allocated time slot of one frame of TDMA, while the other seven time slots are in an idle state.

When a GSM mobile terminal sends high output information on a radio frequency, a power amplifier (PA) of the terminal raises a pulse current up to a maximum value for one time slot period, e.g., 2.5 A for a 577 μs period. This rise in pulse current derives from a terminal battery and may be repeatedly performed every TDMA frame period (e.g., 4.615 ms) as long as data transmission is performed.

Figure 1:
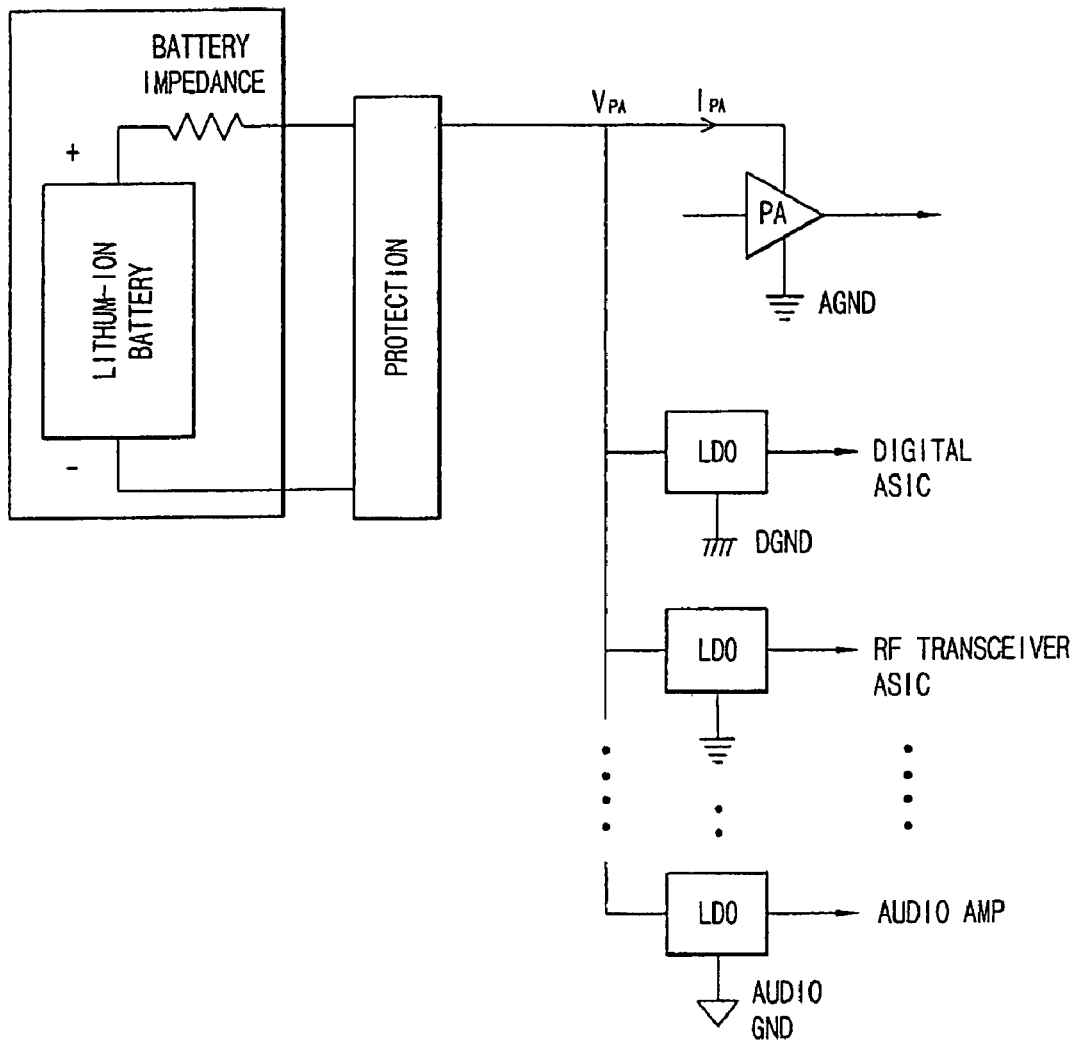
FIG. 1 is a diagram showing a power unit of a GSM mobile terminal.

As shown in FIG. 3, during data transmission, power voltage level is affected by a GSM burst. In a worst case, a lithium ion battery may have a 120 mΩ serial resistance. Thus, about a 300 mV voltage drop is generated for the 577 μs burst period. (Here, $I_{PA}$ represents current supplied to the power amplifier from the battery and $V_{PA}$ represents the voltage applied to this amplifier. These values are illustratively shown in FIG. 1).

Figure 4:
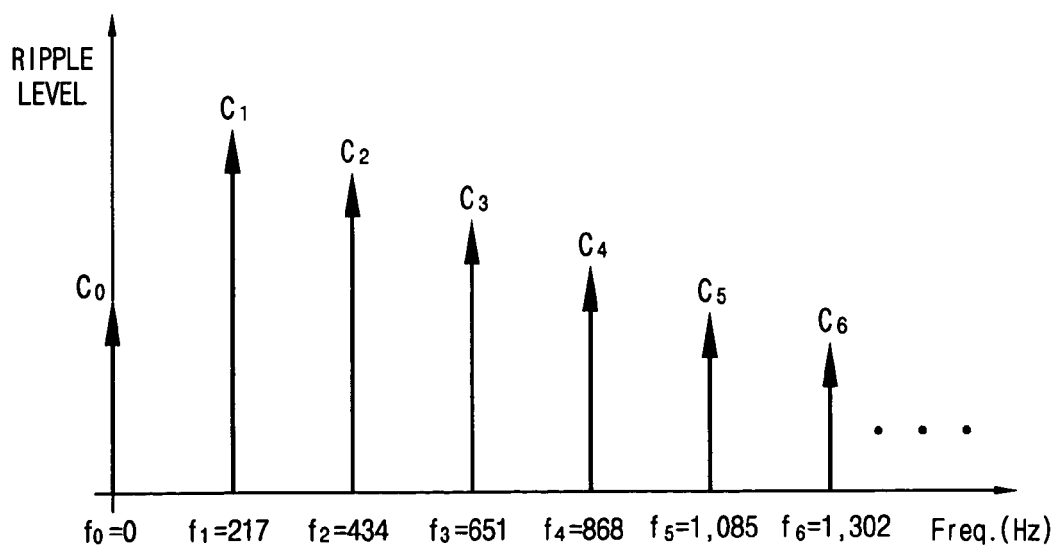
FIG. 4 is a graph showing distribution of a power ripple spectrum according to a battery drop voltage in accordance with the related art.

FIG. 4 is a graph showing a frequency spectrum of a power ripple generated by a voltage drop during a GSM burst. In this graph, a frequency distribution is shown where a frequency C1 of 217 Hz is obtained during a time period of one TDMA frame (e.g., 4.615 ms). The size of C1 is proportional to a degree of the voltage drop in FIG. 3. C2, C3, C4, . . . , CN are harmonic components and frequency spectrums in an audible range in which every person can listen. By reducing the level down to a degree of a predetermined harmonic (e.g., sixth harmonic) component among the power ripples in the audio frequency, a cause of TDMA noise can be removed.

Figure 5:
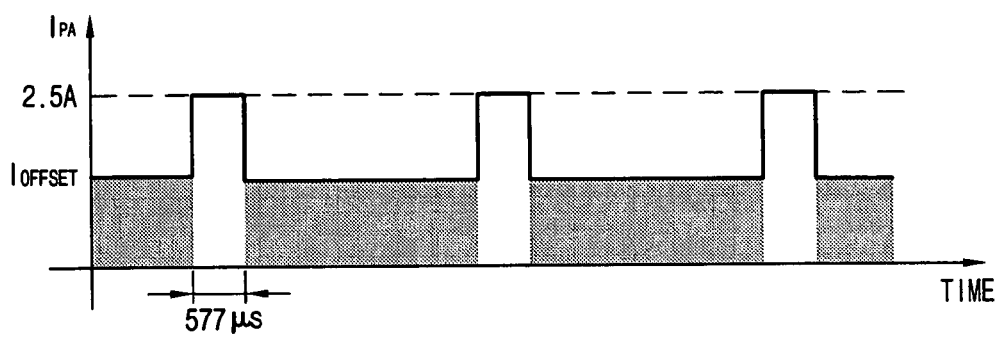
FIG. 5 is a graph showing generation of an offset voltage according to one preferred embodiment of the present invention.
Figure 6:
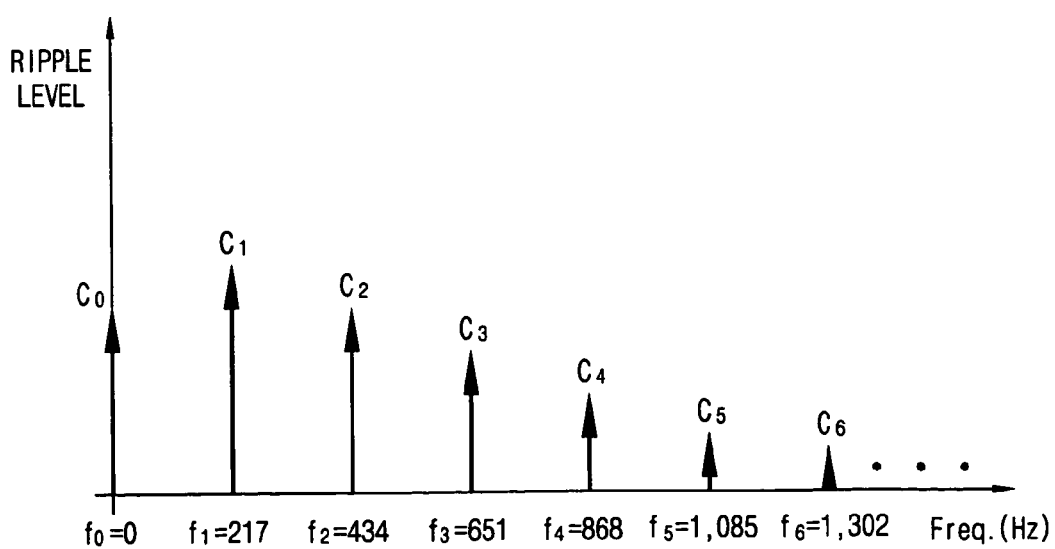
FIG. 6 is a graph showing power ripple reduction achieved in accordance with the preferred embodiment of the present invention.

FIG. 5 is a graph showing generation of an offset voltage according to a preferred embodiment of the present invention, and FIG. 6 is a graph showing a power ripple reduction achieved according to a battery voltage drop resulting from the offset voltage in FIG. 5. As shown in FIGS. 5 and 6, a terminal battery experiences a voltage drop when current $I_{PA}$ is amplified by the power amplifier during or just prior to data transmission; that is, during an active time slot. However, unlike in FIG. 3, this voltage drop is reduced by applying an arbitrary noise level to one or more idle slots in the TDMA frame.

More specifically, the present invention generates a noise signal during an idle slot to thereby generate an offset voltage ($V_{offset}$). This, in turn, reduces an overall voltage drop difference by an amount Δ, and this causes a proportional reduction of the TDMA noise component, e.g., up to the sixth harmonic. While the noise signal applied during the idle slot reduces the voltage drop between an active slot and the idle slot, it is not actually transmitted through an antenna. This is because an antenna switch at a rear stage of the power amplifier does not transmit data (e.g., is switched off) during idle time slot periods.

A suitable value of the noise level to be applied may differ depending on a voltage drop value during the time burst, or depending on power supply rejection ratio (PSRR) characteristics values of the audio amplifier. The PSRR is a value indicative of performance of removing a spectrum component in the audio frequency. Most components have a value of about −70 dB in the frequency of 200 Hz-1.5 kHz. Thus, in order to cancel TDMA noise, a PSSR characteristics value of about −80 dB may be obtained and therefore about −10 dB of ripple level may be additionally reduced calculatively.

If a maximum 300 mV of voltage drop occurs, the C1 value that exists before applying a noise level would be about 75 mV (37.5 dBm). In order to cancel TDMA noise, C1 may be about 25 mV (28 dBm), which is a reduction of less than 10 dB. Accordingly, a fundamental noise level generated during the idle slot needs only to correspond to about 50 mV (75 mV-25 mV). In this respect, however, a greater $V_{offset}$ value of about 70 mV-100 mV may be generated in consideration of other harmonic components inclusive. Thus, a noise level to be generated during the idle slot should be about 70 mV-100 mV. However, this is only a theoretically calculated value and there can be some difference depending on the voltage drop value as mentioned above.

Thus, in accordance with at least one embodiment of the present invention, the transmitter is operated in a normal manner with the antenna switched on during an active time slot. However, in order to cancel TDMA noise, a noise signal may be generated during all, a portion, or just one of the idle time slots in a TDMA frame. This will create the offset voltage required to achieve the desired noise suppression.

Figure 7:
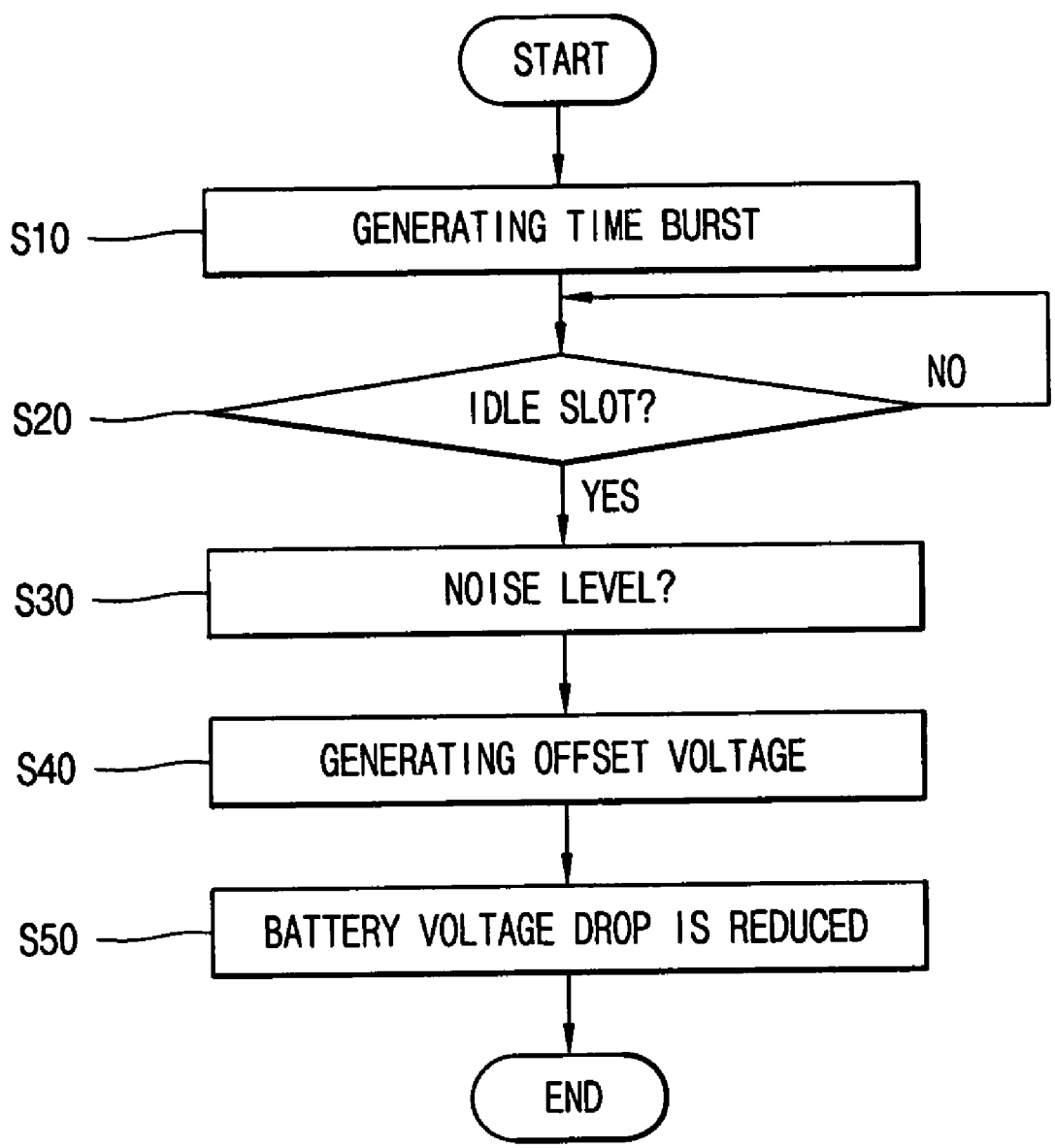
FIG. 7 is a flow chart showing steps included in a method for canceling noise of a mobile terminal in accordance with the preferred embodiment of the present invention.

FIG. 7 is a flow chart showing steps included in a method for canceling noise of a mobile terminal in accordance with a preferred embodiment of the present invention. When a time burst is generated on the battery power line (step S10), a check is performed to determine whether a current time slot is an idle slot (step S20). The time burst may be detected by a detector in the terminal. The detector may be, for example, a processor (e.g., an MSM or other integrated circuit chip) in the terminal. If the current time slot is an idle slot, a noise level is applied (step S30). Then, an offset voltage is generated (step S40) and accordingly an overall battery voltage drop is reduced (step S50). This reduction of the battery voltage drop corresponds to or is effected by a reduction of the TDMA noise component.

As so far described, the method for canceling noise of a mobile terminal in accordance with the present invention has at least the following advantages. Since the ripple of overall battery power is reduced by reducing the battery voltage drop due to the power amplifier, power can be stably supplied to every circuit. In addition, the source itself causing TDMA noise can be reduced without using an audio power terminal. As a result, a more compact terminal can be manufactured.

Several methods may be used in accordance with the present invention for generating noise during one or more idle time slots. According to one embodiment, a noise level can be supplied by performing arbitrary channel application when, for example, the idle slot is in baseband. In accordance with at least one embodiment, the term 'arbitrary channel application' includes the situation where a baseband signal unit generates certain I and Q signals in an idle slot, such that a $\sqrt{I^2+Q^2}$ value may lie in a range which, for example, is about 70 mV-100 mV. These voltages may also be expressed as a range of noise level reduction values measured in dB.

According to another embodiment, the transceiver can generate thermal noise in one or more idle slots. This will result in supplying a suitable noise level to the power amplifier to thereby create the TDMA noise suppression desired. Here, 'thermal noise generation' may include the case where a portion of power of the terminal is turned on to generate a $V_{offset}$ value, or power is supplied to one or more components of the transceiver. When power is supplied to the transceiver in this manner, the transceiver will consume power, thereby producing heat which results in thermal noise. As an example, an amount of thermal noise may be generated which produces a $V_{offset}$ in the range of about 70 mV-100 mV during all or a portion of the idle time slots in a TDMA frame.

Various other noise methods for generating noise during the idle slot may also be used, and the present invention is considered to include all the methods for canceling TDMA noise. This is because, in the present invention, in order to cancel TDMA noise, a certain noise level is generated in the idle state among GSM bursts to reduce the battery voltage drop due to the power amplifier.

In accordance with another embodiment, the present invention is a computer-readable medium which stores a computer program having code for implementing all or a portion of the steps in the methods described above. The computer-readable medium may be a flash memory, ROM, SRAM or any other chip or integrated circuit capable of storing information.

Also, in accordance with any one or more of the embodiments described herein, applying a noise signal during a time slot may include but is not limited to the case where the noise signal is generated in the transmitter (or transceiver) of the terminal or the transmitter (transceiver) is operated to generate the noise signal. During this time, the transmitter (transceiver) is preferably disconnected from the antenna of the terminal so that no actual transmission of the generated noise signal occurs.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for canceling noise in a mobile terminal, comprising:

when a time burst occurs, performing a check to determine whether a current time slot is an idle slot; and if the current time slot is an idle slot, applying a predetermined noise level to a transceiver during the idle slot to generate an offset voltage of a predetermined amount, wherein said offset voltage maintained during an active time slot to reduce a voltage drop of a battery for driving the transceiver at a time when data is transmitted within the active time slot.

2. The method of claim 1, wherein the voltage drop of the battery produced by said offset voltage suppresses generation of TDMA noise.

3. The method of claim 1, wherein the predetermined noise level is applied to a plurality of time slots in a TDMA frame.

4. The method of claim 1, wherein the idle slot is checked during a time when no data transmission occurs.

5. The method of claim 1, wherein the mobile terminal is TDMA terminal.

6. The method of claim 1, wherein applying the noise level includes:

performing an arbitrary channel application when the idle slot corresponds to a baseband frequency.

7. The method of claim 1, wherein applying the noise level includes:

generating thermal noise in the idle slot, wherein the thermal noise is generated by a transceiver of the terminal.

8. The method of claim 7, wherein generating the thermal noise includes:

supplying power to the transceiver for power consumption based on the offset voltage, wherein the offset voltage lies in a prescribed range.

9. The method of claim 8, wherein the prescribed range is at least approximately 70 mV-100 mV.

10. The method of claim 1, wherein the reduced voltage drop produced by said offset voltage reduces TDMA noise to a predetermined higher-order harmonic.

11. The method of claim 10, wherein the predetermined higher-order harmonic includes a sixth harmonic of the TDMA noise.

12. The method of claim 1, wherein the voltage drop reduced by said offset voltage is based on a difference between a first voltage that corresponds to said offset voltage and a second voltage that corresponds to an upper limit of the voltage drop of the battery during the active time slot.

13. The method of claim 12, wherein the upper limit is a maximum upper limit of the voltage drop of the battery during the active time slot.

14. The method of claim 1, wherein said offset voltage is applied to the transceiver of the mobile terminal during the idle slot.

15. A method for canceling noise in a mobile terminal, comprising:

when a time burst occurs, performing a check to determine whether a current time slot is an idle slot; and if the current time slot is an idle slot, applying a predetermined noise level to a transceiver during the idle slot to generate an offset voltage, wherein said offset voltage reduces a voltage drop of a battery for driving the transceiver at a time when data is transmitted within an active time slot, and wherein applying the noise level includes:

performing an arbitrary channel application when the idle slot corresponds to a baseband frequency, wherein the arbitrary channel application includes having a baseband signal unit generate arbitrary I and Q signals in the idle slot, such that a $\sqrt{I^2+Q^2}$ value lies within a prescribed range.

16. The method of claim 15, wherein the prescribed range is approximately 70 mV-100 mV.

17. The method of claim 15, wherein the prescribed range corresponds to a desired level of noise reduction measured in dB.

18. The method of claim 15, wherein the $\sqrt{I^2+Q^2}$ value corresponds to a desired PSSR characteristic value.

19. The method of claim 18, wherein the desired PSSR characteristic value achieves at least −80 dB noise reduction.

20. A method for canceling noise of a mobile terminal, comprising:

detecting a time burst in a battery power line; and applying a noise level to at least one idle slot in a TDMA frame, wherein the noise level generates an offset voltage of a predetermined amount, the offset voltage maintained during an active time slot to reduce a voltage drop of a battery for driving a transceiver of the mobile terminal at a time when data is transmitted within the active time slot of the TDMA frame.

21. The method of claim 20, wherein applying the noise level includes:

performing an arbitrary channel application when the idle slot corresponds to a baseband frequency.

22. The method of claim 20, wherein applying the noise level includes:

generating thermal noise in the idle slot from a transceiver of the terminal.

23. The method of claim 22, wherein applying the noise level includes:

supplying power to at least one predetermined circuit of the transceiver, and generating an offset voltage to produce the thermal noise.

24. The method of claim 23, wherein the offset voltage lies in a prescribed range.

25. The method of claim 24, wherein the prescribed range is approximately 70 mV-100 mV.

26. The method of claim 20, wherein the terminal is a TDMA terminal.

27. The method of claim 20, wherein the voltage drop reduced by said offset voltage is based on a difference between a first voltage that corresponds to said offset voltage and a second voltage that corresponds to an upper limit of the voltage drop of the battery during the active time slot.

28. The method of claim 27, wherein the upper limit is a maximum upper limit of the voltage drop of the battery during the active time slot.

29. The method of claim 20, wherein said offset voltage is applied to the transceiver of the mobile terminal during the idle slot.

30. A method for canceling noise of a mobile terminal, comprising:

detecting a time burst in a battery power line; and applying a noise level to at least one idle slot in a TDMA frame wherein the noise level generates an offset voltage that reduces a voltage drop of a battery for driving a transceiver of the mobile terminal at a time when data is transmitted within an active time slot of the TDMA frame, wherein applying the noise level includes:

performing an arbitrary channel application when the idle slot corresponds to a baseband frequency, wherein the arbitrary channel application includes having a baseband signal unit generates arbitrary I and Q signals in the idle slot, such that a $\sqrt{I^2+Q^2}$ value lies within a prescribed range.

31. The method of claim 30, wherein the prescribed range is approximately 70 mV-100 mV.

32. The method of claim 30, wherein the prescribed range corresponds to a desired level of noise reduction measured in dB.

33. The method of claim 30, wherein the $\sqrt{I^2+Q^2}$ value corresponds to a desired PSSR characteristic value.

34. The method of claim 33, wherein the desired PSSR characteristic value achieves at least −80 dB noise reduction.

* * * * *